United States Patent [19]
Reeves

[11] 3,850,615
[45] Nov. 26, 1974

[54] METHOD OF ILMENITE REDUCTION
[75] Inventor: James W. Reeves, Wilmington, Del.
[73] Assignee: E. I. du Pont de Nemours and Company, Wilmington, Del. ; 1
[22] Filed: Nov. 9, 1972
[21] Appl. No.: 305,082

Related U.S. Application Data
[63] Continuation-in-part of Ser. No. 92,539, Nov. 24, 1970, abandoned, which is a continuation-in-part of Ser. No. 680,522, Nov. 3, 1967, abandoned.

[52] U.S. Cl................................. 75/26, 75/1, 75/33
[51] Int. Cl............................................. C22b 5/10
[58] Field of Search .............................. 75/1 Ti, 33

[56] References Cited
UNITED STATES PATENTS

| | | | |
|---|---|---|---|
| 2,750,255 | 6/1956 | Creitz et al. | 75/1 X |
| 2,848,303 | 8/1958 | Cooper | 75/1 X |
| 2,933,373 | 4/1960 | Love et al. | 23/202 |
| 3,097,090 | 7/1963 | Aamot | 75/33 |
| 3,235,375 | 2/1966 | Meyer et al. | 75/34 |
| 3,291,599 | 12/1966 | Reeves | 75/103 |
| 3,383,200 | 5/1968 | Volk | 75/1 X |

FOREIGN PATENTS OR APPLICATIONS
598,458   5/1960   Canada..................................... 75/3

*Primary Examiner*—Winston A. Douglas
*Assistant Examiner*—Thomas A. Waltz

[57] ABSTRACT

Beneficiation of ferrotitaniferous ores using a particulate relatively coarse, solid carbonaceous reducing agent to reduce iron from the ferrous to the metallic state in a fluidized bed, with a relatively fine component of reducing agent suspended in the fluidizing medium to provide heat to the reaction.

3 Claims, 1 Drawing Figure

PATENTED NOV 26 1974
3,850,615
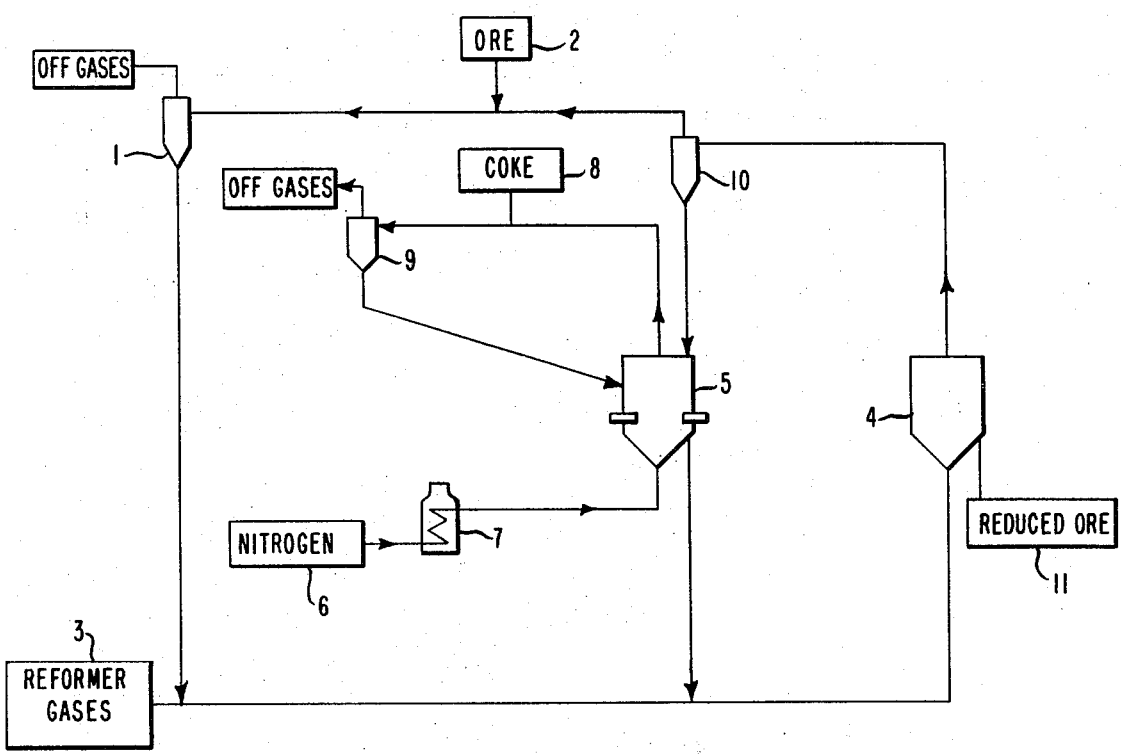
INVENTOR
JAMES W. REEVES
BY Carl A. Hechmer
ATTORNEY

METHOD OF ILMENITE REDUCTION

CROSS REFERENCE TO RELATED APPLICATIONS

This application is a continuation-in-part of application Ser. No. 92,539, filed Nov. 24, 1970 now abandoned, which in turn is a continuation-in-part of application Ser. No. 680,522, filed Nov. 3, 1967, now abandoned.

BACKGROUND OF THE INVENTION

Titaniferous ores, used as raw materials in the production of titanium metal or titanium compounds, contain numerous other metallic constituents, the major one being iron. In most commercial ilmenite, a principal type of titanium-bearing ore, the iron content is between 30 and 80 percent of the $TiO_2$ content, and the $TiO_2$ ranges between 30 and 55 percent by weight of the ore. Since only minor amounts of iron can be tolerated in titanium-bearing products prepared from titaniferous ores, principally pigmentary titanium dioxide and titanium metal, iron must be removed in the manufacturing process. For economy and capacity, it is frequently advantageous to remove as much iron as possible before ore is fed to this pigment manufacturing process.

DESCRIPTION OF THE PRIOR ART

Many methods of chemical treatment have been suggested in the prior art for beneficiation of titanium-bearing ores. Among these methods are the preferential extraction of iron by the use of various acids to form soluble iron salts, or the use of halogenating gases such as, for example, hydrogen chloride or chlorine to render volatile the iron content of the ore. Other procedures which have been suggested include the roasting of the ferrotitaniferous ore either in oxidizing or reducing atmospheres so as to convert the iron into a form in which it is more readily extractable by leaching in dilute acids or other reagents. Although many of these processes have been found effective in reducing the iron content of the titaniferous ores, they have not in general proved to be wholly economical due to the comparatively high cost of the reagents used, the investment in equipment which is required to carry out these operations and, frequently, incomplete removal.

The preferred process of the prior art is one using a gaseous reductant in the presence of carbon, the carbon reacting in secondary reactions with the primary reaction products. These reactions, since they are endothermic, require externally supplied heat to maintain the 1000°C. required temperature. One method which has been used to supply the required heat is the installation of electrical resistance heaters in the fluidized ore-reduction bed. This is a process patented in U.S. Pat. No. 3,291,599 and although it is a completely workable and efficient method of supplying the necessary heat, the method requires large scale operation with minimum electric power cost to prove economically feasible.

SUMMARY OF THE INVENTION

In accordance with the present invention a process is provided for effecting chemical reduction of the iron content of a ferrotitaniferous ore to the metallic state by the continuous steps of:

A. feeding to a fluid bed reactor chamber reactants which consist essentially of
1. solid components composed of
   a. 20 to 60 percent by weight of ferrotitaniferous ore in a particle size range of about 80 to 100 mesh, said ore being preheated to 900° to 1100°C. and having its iron content in the ferrous form, and
   b. 40 to 80 percent by weight of preheated solid carbonaceous reducing agent in particulate form essentially all of which is 20–150 mesh size, at least 25 percent of said reducing agent being coarse particles of about 20–40 mesh size and at least 25 percent of said reducing agent being fine particles of about 80–150 mesh size, and
2. reformer gas, preheated to from about 950° to 1100°C., the solid components being maintained in a fluid state in said chamber by upward flow of said reformer gas therethrough and further being maintained at a temperature of 1000° to 1100°C. by control of the temperature of the preheated reactants and without otherwise supplying heat to said chamber, B. removing from said chamber an ore fraction, in which at least 90 percent by weight of the iron content thereof is in the metallic state, and an off-gas fraction, each of said fractions containing unoxidized fine particles of said solid reducing agent, and C. separating said solid reducing agent from each of said fractions, applying further heat thereto in a zone remote from said chamber, and recycling same along with make-up ore and reducing agent to said chamber.

In the operation of the process, iron in metallic state is thus readily separable from the titanium-bearing portions of the ore. The solid reducing agent, having been carefully sized, so that a portion of it remains with the ore in adequate concentration in the fluid bed reaction chamber, thus acts as a reductant for the ore, while a fine portion moves through the reaction bed and is recycled to a reheating circuit. As the reaction proceeds consuming part of the coarse reducing agent, the size of the coarse particles is diminished to the point where some of these particles become small enough to be carried out of the reactor with the exit gases. For operation with a preferred ore size of 80–100 mesh, the preferred reducing agent and fuel is coke, the relatively fine particles of which are suspended in the fluidizing medium and act as fuel being of an 80–150 mesh size which passes through, whereas, the relatively particles retained in the bed for the reduction reaction have a particle size of 20–40 mesh. The coarse fraction serves both for reduction and as an inert diluent to prevent agglomeration of the reduced ore. The ratio of size fractions fed will be dependent upon particle fracture rates, chemical reactivity, and the rate of operation of the process. Advantageously, essentially all of the reducing agent is 20–150 mesh size, at least 25 percent thereof being 20–40 mesh and at least 25 percent being 80–150 mesh.

DESCRIPTION OF THE DRAWING

The FIGURE is a schematic flow sheet illustrating the process of the present invention.

Referring more particularly to the FIGURE and a preferred embodiment of the invention, dilute phase reactor 1 receives preheated titaniferous ore from ore source 2 at a temperature of about 950°C., and reduces its iron content from the ferric to the ferrous condition, but not to metallic iron (as taught in Zenz et al., "Fluidization and Fluid Particle Systems," Reinhold, 1960). The partially reduced ore, still at about 950°C., is mixed with and conveyed by reformer gas (CO and $H_2$) fed in at reformed gas supply 3 at a temperature of about 1050°C. Prior to reaching fluidized bed reactor 4, the ore and reformer gas are mixed with coke of two distinct particle sizes, heated, preferably by electrical means, to a temperature of about 1200° at coke preheater 5, which preferably is operated as a fluid-bed system, the fluidizing gas being nitrogen from nitrogen source 6 introduced into the coke preheater at a temperature of about 1000°C. after passing through nitrogen heater 7. A small amount of oxygen may be introduced with the nitrogen so that a portion of the coke will burn in coke preheater 5 to raise the temperature to the desired 1200°C. Make-up coke enters the system from coke source 8 and is recirculated through the fluidized bed of coke preheater 5 to raise it to temperature, cyclone separator 9 serving to separate the solids from the fluidizing gases of preheater 5. Recycle coke, entrained in the off-gases from reactor 4 and separated at cyclone separator 10 is also added to coke preheater 5 for mixing with the partially reduced ore and reformer gases. The coke which is fed to fluidized bed reactor 4, along with reformer gas and the partially reduced ore, is carefully sized, so that under equilibrium conditions there are maintained two size fractions: a 20-40 mesh screen size which will be retained in the bed and act as the chief reducing agent for the ore in the reactor and effect reduction of the ore from ferrous to about 95 percent in the metallic condition, and an 80-100 mesh size which will act as a fuel and supply heat to the system. The reduced ore is removed from the system at reduced ore storage 11. The off-gases from the cyclone 10, at about 900°C., convey preheated ore to dilute phase reactor 1. The ore which is introduced from ore source 2 has been preheated in a part of the system (not shown) by off-gases at about 950°C. from dilute phase reactor 1.

Although it is desirable to reduce a portion of the iron content of the ore from the ferric to the ferrous state in a pre-reactor as is described in the above examples of operation, it is within the scope of the invention to carry out all of the iron reduction, that is from ferric to metallic iron, within the fluid bed reactor chamber shown as 4 in the FIGURE.

To describe the process of this invention in greater detail and referring to the FIGURE, preheated ferrotitaniferous ore at about 950°C. is introduced into the reactor 4. As a reductant material, there is introduced into the reaction chamber, coke which has been recycled from cyclone 10. Pre-reduction of the crude ore, which analyzes about 64 percent $TiO_2$ and 30 percent $Fe_2O_3$, is carried out in dilute phase reactor 1 according to the equation:

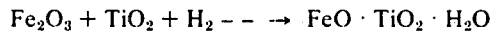

$$Fe_2O_3 + TiO_2 + H_2 \text{-- --} \rightarrow FeO \cdot TiO_2 \cdot H_2O$$

This pre-reduction of the ore is an exothermic reaction and is carried out at about 1200°C. The pre-reduced ore in which the iron content has been reduced from ferric to ferrous condition, is then transported from reactor 1 to a fluidized bed reactor 4 by means of a reformer gas from 3 at a temperature of about 1050°C. Coke of two particle sizes is used, i.e., (1) a coarse fraction which is retained in the fluidized bed reactor 4 along with the ore charge and which serves as a reducing material in the reactor and to prevent agglomeration of the reduced ore in the reactor, and (2) a fine fraction, recycled from the reactor which serves chiefly as a fuel and heat transfer medium. Coke is the chief reducing agent in the fluidized bed reactor to effect the reduction of $FeO \cdot TiO_2$ to iron of about 95 percent in the metallic state, about 5 percent remaining in the ferrous state. The CO and $H_2$ reformer gas acts chiefly as a transporting medium to carry the preheated coke and ore into the reactor and through the recycle system. The ore which has been reduced in fluidized bed reactor 4 is removed into reduced ore storage 11 while the off-gases are recirculated to cyclone 10. The off-gases are about 5 percent $CO_2$ and $H_2O$. The solids which are removed from the off-gases by the action of one or more cyclones 10 are introduced into the fluidized bed recycle coke heater 5 which preferably is heated by an electric arc heater although any other means of heating may be used at this point. The temperature of this heating chamber is maintained at about 1200°C. so that the recycle coke together with the make-up coke, now consisting of the two sizes as noted above, will be heated to a temperature of 1200°. An inert gas, preferably nitrogen, from source 6 is introduced at a temperature of about 1000°C. in order to maintain the heat balance in the system. If desired, some oxygen may be introduced with the inert gas to effect combustion of a portion of the coke to furnish a portion of the preheat required for the coke. Thus, it will be seen that a heat balance is maintained in the system of interconnecting lines and reactors which use the exothermic reactions and the sensible heat of off-gases along with the preheated gases as a means of economically reducing ferrotitaniferous ores to a condition in which the titanium content of the ore remains essentially unchanged while the iron is reduced to about 95 percent of the metallic state and about 5 percent in the ferrous state.

In practical operation, a reactor of 10 feet internal diameter contains a 30 ton bed of which 30 percent is coke. Furnace blow-over of 25 tons coke per hour and 1 ton ore per hour is recycled, the off-gas being used to pre-reduce from ferric to ferrous the iron content of the crude titaniferous ore in a dilute phase reactor. Crude ore is preheated to 950°C. at a rate of 28 tons per hour by direct combustion of gas and preheated air before being fed to the dilute phase pre-reducer. Eight tons per hour of make-up coke is preheated to 800°C. and then combined with the 25 tons per hour of blow-over coke from the reactor 4.

The combined sensible heat of the coke and ore fed to the fluidized bed reactor 4 are solely responsible for maintaining the 1000°C. temperature necessary to effect reduction by means of coke as the chief reducing agent. This eliminates the need for direct heat being applied to the reactor, i.e., by otherwise supplying heat as for example by internal heaters inside the fluidized bed reduction reactor which would give rise to a tendency for particles to stick together. Generally a temperature of from about 1000°C. to 1100°C. is used in the fluidized bed reactor to provide reduction at an efficient rate without development of hot spots. When using a proportion of 20 to 60 percent ore to 80 to 40 percent reducing agent, the reaction temperature can be maintained by preheating the reducing agent from about 50°C. to about 250°C. above the temperature desired in the fluidized bed, provided an adequate proportion of the reducing agent is in the relatively fine particulate form. While the proportion of fine to coarse components in the reducing agent may vary widely, it is preferred that it be maintained within the limits of 25:75 to 75:25. Generally, 50:50 is suitable with the use of higher proportions of fines favoring the development of higher temperatures.

The term "solid carbonaceous reducing agent" is intended to include high-carbon content fuel materials within the designated particle sizes, such as, for example, anthracite or bituminous coal, or coke breeze. The preferred carbonaceous reducing agent for use in the invention is coke, and the examples of operation which are given employ this reducing agent. The invention is not to be considered as limited to the use of coke, however.

It will be seen from the description which is given of the process of this invention that there is disclosed an ilmenite reduction process which can be operated without installation of expensive equipment and which employs low cost ingredients for its operation. The method is easily controlled, and eliminates the need for a large volume of reducing or chlorinating gases which are expensive and difficult to handle.

Many equivalent modifications will become apparent to those skilled in the art from a reading of the above without a departure from the inventive concept.

What is claimed is:

1. An improved process for effecting chemical reduction of the iron content of a ferrotitaniferous ore to the metallic state wherein the reducing agent is solid carbonaceous material and the reduction reaction is initiated and maintained solely by means of heat applied to the reactants, said process comprising the continuous steps of:

A. feeding to a fluid bed reactor chamber reactants which consist essentially of
   1. solid components composed of
      a. 20 to 60 percent by weight of ferrotitaniferous ore in a particle size range of about 80 to 100 mesh, said ore being preheated to 900° to 1100°C. and having its iron content in the ferrous form, and
      b. the remainder by weight being preheated solid carbonaceous reducing agent in particulate form essentially all of which is 20–150 mesh size, at least 25 percent of said reducing agent being coarse particles of about 20–40 mesh size which remains a part of the ore-reducing agent mixture and at least 25 percent of said reducing agent being fine particles of about 80–150 mesh size which remains a part of the fluidizing medium, and
   2. reformer gas, preheated to from about 950°C. to 1100°C.,
   the solid components being maintained in a fluid state in said chamber by upward flow of said reformer gas therethrough and further being maintained at a temperature of 1100° to 1100°C. without direct heat by control of the temperature of the preheated reactants,
   B. removing from said chamber an ore fraction, in which at least 90 percent by weight of the iron content thereof is in the metallic state, and an off-gas fraction, each of said fractions containing unoxidized fine particles of said solid reducing agent, and
   C. separating said solid reducing agent from each of said fractions, applying further heat thereto in a zone remote from said chamber, and recycling same along with make-up ore and reducing agent to said chamber.

2. The process of claim 1 wherein the said ferrotitaniferous ore is ilmenite.

3. The process of claim 1 wherein the carbonaceous reducing agent is coke.

* * * * *

PO-1050
(5/69)

UNITED STATES PATENT OFFICE
CERTIFICATE OF CORRECTION

Patent No. 3,850,615          Dated November 26, 1974

Inventor(s) James W. Reeves

It is certified that error appears in the above-identified patent and that said Letters Patent are hereby corrected as shown below:

In the Claims, Column 6, line 23, the lower limit of the temperature range reading "1100°" should read --1000°--.

Signed and sealed this 11th day of February 1975.

(SEAL)
Attest:

RUTH C. MASON
Attesting Officer

C. MARSHALL DANN
Commissioner of Patents
and Trademarks